United States Patent [19]

Cohen

[11] Patent Number: 4,553,818

[45] Date of Patent: Nov. 19, 1985

[54] DIRECTIONAL FILTER FOR FILTERING AMBIENT LIGHT

[75] Inventor: Richard L. Cohen, Matawan, N.J.

[73] Assignee: Allied Corporation, Morris Township, Morris County, N.J.

[21] Appl. No.: 560,689

[22] Filed: Dec. 12, 1983

[51] Int. Cl.⁴ .............................................. G02B 5/20
[52] U.S. Cl. .................................................. 350/276 R
[58] Field of Search ........................... 350/276 R, 316

[56] References Cited

U.S. PATENT DOCUMENTS 2,053,173  9/1936  Astima ................................. 350/276

*Primary Examiner*—John K. Corbin
*Assistant Examiner*—Rebecca D. Gass
*Attorney, Agent, or Firm*—Anthony F. Cuoco; Howard G. Massung; Stanley N. Protigal

[57] ABSTRACT

A directional filter for ambient light is constructed from a thin base strip (2) of indeterminate length and having an opaque surface (4). The strip is wound into a roll (8) having a plurality of convolutions (10) and sections (12, 14, 16 and 18) are cut from the face of the roll. A pair of sections are disposed so that their convolutions are in an orthogonal configuration, and are sandwiched between a pair of glass plates (20, 22) having non-reflective outside surfaces (20A). Channels (24) are thereby provided, which impart directional characteristics to the ambient light.

11 Claims, 5 Drawing Figures

DIRECTIONAL FILTER FOR FILTERING AMBIENT LIGHT

BACKGROUND OF THE INVENTION

Directional filters are used to filter light entering the filter from outside of a predetermined angle of incidence. These filters find particular use in cathode ray tube (CRT) heads down display apparatus in aircraft cockpits.

Heads down display apparatus of the type described is used to display, for example, a wide variety of aircraft navigational information in the cockpit of an aircraft for viewing by the pilot of the craft. Often the detailed nature of the displayed information makes it difficult to read under varying ambient light conditions. Consider, for example, that when ambient light is low, as in night flying, it is a relatively simple task to reduce the brightness of the display. On the other hand, there are frequently ambient light conditions which require a display brightness that would be impractical either as a result of the capabilities of the display or in consideration of the safety or comfort of the pilot-viewer. For example, if sunlight is creating a high glare condition, the display will not only have to overcome the glare, but must be bright enough for the displayed information to be discernible over background lighting conditions. The situation is magnified when it is considered that during the aircraft's maneuvering, ambient light can be expected to rapidly change.

The fixed position of the pilot-viewer enables the use of filter techniques which impart directional characteristics to ambient light. Accordingly, directional filters of various types have been disposed in front of the CRT face plate in order to block ambient light which tends to cause glare, while passing that light which is traveling in the direction of the pilot-viewer.

In one type of prior art directional filter, a sheet of material is etched to form a multiplicity of holes. The surface of the sheet at the holes has a high light absorbency characteristic which eliminates reflection along the holes and at the surface of the sheet. Frequently the sheets are stacked in order to enhance the light attenuation effect of the filter. Filters of this type are expensive to make and may have undesirably excessive light attenuation characteristics.

Another type of directional filter features a filter plate constructed from a plurality of thin sheets which are stacked so that each sheet is parallel to a direction of admitted light. The filter is formed by cutting a slice across the stack. This results in the filter being generally orthogonal to the direction of the individual sheets from which it is made, with the sliced direction varying from the orthogonal for central viewing angles which vary from the normal to the filter surface. Filters of this type are also expensive to produce.

Still another type of filter, such as described in commonly assigned copending U.S. application Ser. No. 476,297 filed by the present applicant on Mar. 17, 1983, is formed from a transparent plate having a plurality of etched grooves thereon. The grooves have a high light absorbency characteristic, particularly for light radiating toward the grooves from within the plate. Therefore, light entering the plate at an angle which causes the light to impinge upon the grooves is highly attenuated, whereas light entering the plate and not impinging upon the grooves is attenuated only by the optical characteristics of the plate. Filters of this type are somewhat more complicated and expensive to produce than is desired.

Accordingly, it is an object of the present invention to provide a directional filter for filtering ambient light which avoids the aforenoted disadvantages of prior art filters. Additionally, the filter of the present invention has relatively high light transmission capabilities and avoids secondary light reflections as will be understood upon reading the following description thereof.

SUMMARY OF THE INVENTION

This invention contemplates a directional filter formed from a thin base strip of indeterminate length, with one of the surfaces of the strip being opaque. The strip is tightly wound so as to form a roll having a plurality of convolutions, each having an opaque surface. The opaque surface of the convolutions provides a barrier to light outside of a predetermined angle of incidence. A pair of sections cut from the face of the roll are disposed so that the convolutions are in an orthogonal configuration and the sections are sandwiched between a pair of cover plates. The directional properties of the filter result from light channels thereupon formed.

DETAILED DESCRIPTION OF THE INVENTION

Figure 1:
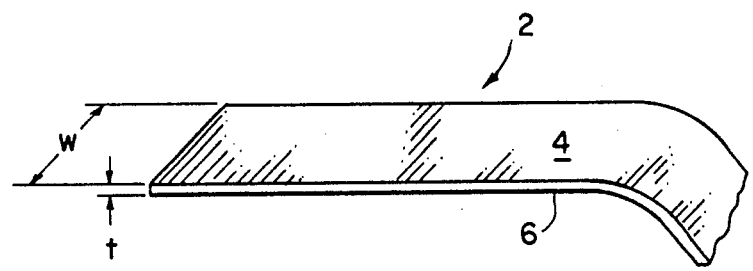
FIG. 1 is a pictorial representation showing a thin base strip of indeterminate length and having an opaque surface in accordance with the invention.

With reference first to FIG. 1, a thin base strip of an indeterminate length is designated by the numeral 2. Strip 2 may be, a polyester film such as that marketed under the trade designation Mylar by the Dupont Corporation, or may be an acetate film such as is commonly used for photographic application. Strip 2 has a surface 4 and a surface 6. Surface 4 is dull black and opaque. This surface can be provided by, for example, processing an unexposed emulsion on the surface, when strip 2 is an acetate film, or by applying the surface by suitable mechanical chemical means when the strip is a polyester film.

Opaque surface 4 provides a barrier to light outside of a predetermined angle of incidence when strip 4 is wound into a convoluted roll as will hereinafter become evident. For purposes of the present invention, strip 2 has a thickness t of approximately 0.005 inches and a width w of approximately 0.030 inches.

Figure 2:
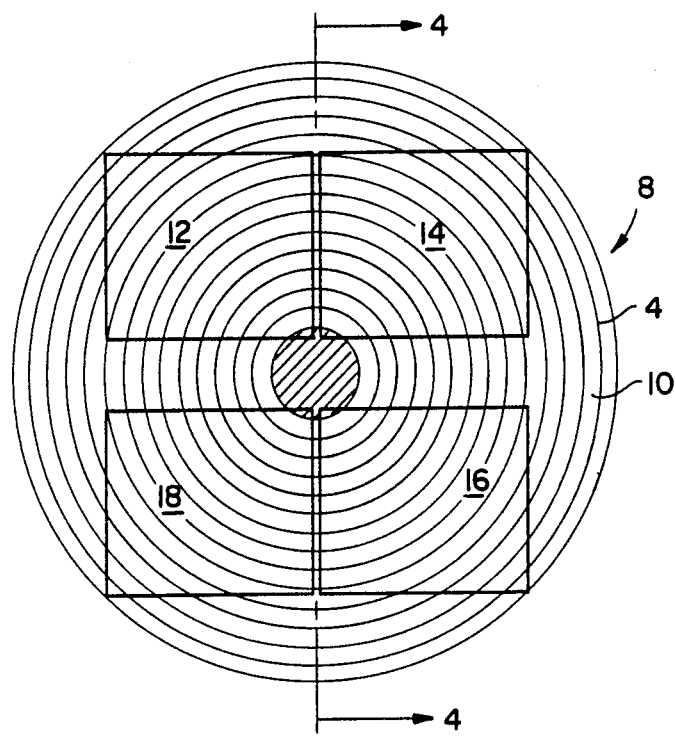
FIG. 2 is a diagrammatic representation showing the strip of FIG. 1 wound into a roll having a plurality of convolutions, and indicating sections of the roll which are arranged to provide a filter in accordance with the invention.

Strip 2 is wound into a roll designated by the numeral 8 in FIG. 2. Roll 8 has a plurality of convolutions such as 10. Each convolution 10 has the aforenoted opaque surface 4. Roll 8 is tightly wound so that there is no air space between convolutions 10 which would detract from the filtering effect to be hereinafter described.

For purposes of providing the filter of the invention, the face of roll 8 is divided into sections in each of its quadrants, such as the sections designated as 12, 14, 16 and 18 in FIG. 2. In this regard it is noted that heads down display apparatus with which the present filter is used commonly includes CRT's having 5 or 6 inch face plates. Thus, roll 8 should be large enough so that each of the sections 12, 14, 16 and 18 are squares of 5 or 6 inches, as the case may be. Sections 12, 14, 16 and 18 are cut out of roll 8 and arranged, as will be described with reference to FIG. 3, to provide the filter of the invention.

Figure 3:
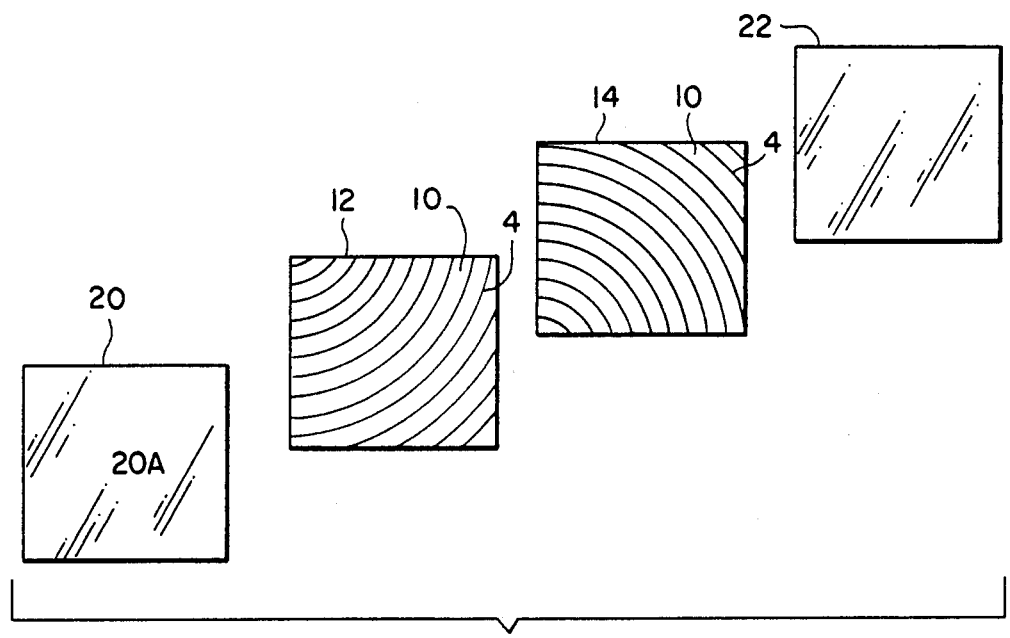
FIG. 3 is a diagrammatic representation showing the components of a filter in accordance with the invention, and wherein the roll sections of FIG. 2 are orthogonally disposed and are sandwiched between a pair of cover plates.
Figure 5:
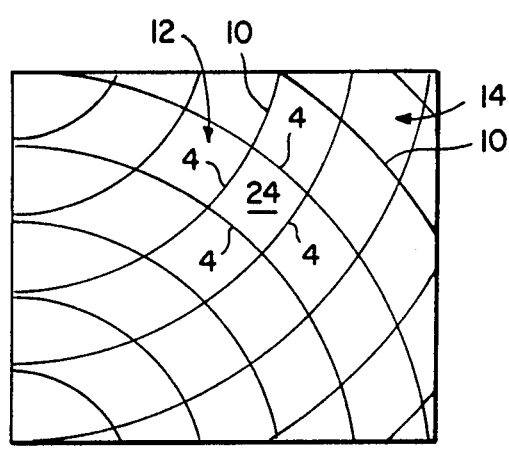
FIG. 5 is a diagrammatic representation best showing the orthogonal disposition of the roll section convolutions shown in FIG. 3.

Thus with reference to FIG. 3, sections 12 and 14, for example, which have been cut from roll 8, are disposed so that their convolutions 10 are in an orthogonal relationship better illustrated in FIG. 5. The roll sections so disposed are sandwiched between a pair of glass cover plates 20 and 22. In this connection it is noted that the outside surfaces of glass plates 20 and 22, such as surface 20A of plate 20, have a non-reflective coating so as to prevent reflection of light from the plates that would otherwise detract from the desired filtering effect.

Roll sections 12 and 14 and glass plates 20 and 22 are suitably bonded together to form an integral filter as will now be understood.

Figure 4:
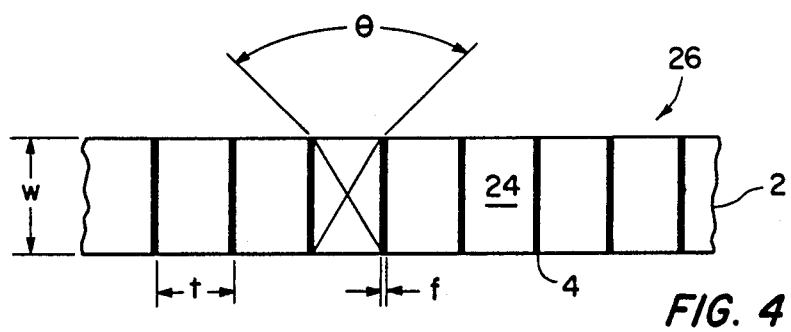
FIG. 4 is an exaggerated diagrammatic view taken along lines 4—4 in FIG. 2 and best showing light channels in accordance with the invention.

With reference to FIG. 4, a viewing angle is designated as $\theta$. As heretofore noted, the width of strip 2 is designated as w and the thickness of the strip is designated as t. The thickness of opaque surface 4 is designated as f.

When strip 2 is wound into convoluted roll 8, as shown in FIG. 2, a plurality of light channels such as channels 24 (FIG. 4) are provided between the convolutions of the roll to form a filter 26. Each of the light channels is bounded by an opaque surface 4 as shown in FIGS. 4 and 5. Light enters the channels 24 and passes through said channels at an angle somewhat smaller than viewing angle $\theta$ due to the well known phenomenon of light refraction. The purpose of disposing roll sections 12 and 14 in orthogonal relationship is to prevent light from entering the sides of filter 26, as will now be understood.

The directional characteristics of the light entering filter 26 result from the geometry of channels 24. It follows, therefore, that viewing angle $\theta$ can be varied by varying base strip width w. That is to say, the larger the width of the base strip, the longer the light channel and the smaller the viewing angle. This is an important feature considering aircraft cockpit architecture constraints which are likely to occur.

It will now be seen that the described filter has distinct advantages over prior art filters. For example, there is no secondary light reflection from the surfaces of strip 2 since strip 2 and opaque surface 4 have the same index of refraction. Further, the filter is simple in construction and has a high light transmission characteristic corresponding to $(t-f/t)$.

With the foregoing description of the invention in mind, reference is to be had to the claims appended hereto for a definition of the scope of the invention.

What is claimed is:

1. A directional filter for filtering ambient light, characterized by:
   first and second sections of a roll formed by winding a thin base strip into a plurality of convolutions, with each of the convolutions having an opaque surface:
   the first and second sections being cut from the face of the roll, with said first and second sections being disposed relative to each other so that their respective convolutions are in an orthogonal relationship;
   said convolutions in an orthogonal relationship cooperating to form light directing channels which are bounded by opaque surfaces: and
   said light directing channels imparting directional characteristics to light entering the filter from outside a predetermined angle and for thereby filtering said light.

2. A filter as described by claim 1, characterized by:
   first and second cover plates;
   the first and second sections disposed relative to each other so that their respective convolutions are in an orthogonal relationship being sandwiched between the first and second cover plates; and
   the first and second sections and the first and second cover plates being bonded together to provide an integral filter.

3. A filter as described by claim 2, characterized in that:
   the first and second cover plates are of glass and the outside surface of each of the plates is non-reflective.

4. A filter as described by claim 1, characterized in that:
   the thin base strip is an acetate film; and
   the opaque surface on the base strip is a processed unexposed emulsion on said acetate film.

5. A filter as described by claim 1, characterized in that:
   the width of the predetermined angle varies inversely with the width of the base strip so that the directional characteristics of ambient light entering the filter are commensurate with the width of the strip.

6. A filter as described by claim 1, characterized by:
   the indices of refraction of the base strip and the opaque surface thereof are substantially the same so as to minimize secondary light reflection from the surfaces of the strip.

7. A filter as described by claim 1, characterized in that:
   the width of the thin base strip is t;
   the thickness of the opaque surface is f; and
   the light transmission characteristic of the filter corresponds to $(t-f/t)$.

8. A filter as described by claim 1, characterized in that:
   the thin base strip is a polyester film; and
   the opaque surface is applied to the polyester film.

9. A directional filter for filtering ambient light, characterized by:
   first and second sections of a roll having a plurality of convolutions, each of the convolutions having an opaque surface;
   the first and second sections being cut from the face of the roll, with said first and second sections being disposed relative to each other so that their respective convolutions are in an orthogonal relationship;

said convolutions in an orthogonal relationship cooperating to form light directing channels which are bounded by opaque surfaces; and said light directing channels imparting directional characteristics to light entering the filter from outside a predetermined angle and for thereby filtering said light.

10. A filter as described by claim 10, characterized by:

first and second cover plates;

the first and second sections disposed relative to each other so that their respective convolutions are in an orthogonal relationship being sandwiched between the first and second cover plates; and the first and second sections and the first and second cover plates being bonded together to provide an integral filter.

11. A filter as described by claim 10, characterized in that:

the first and second cover plates are of glass and the outside surface of each of the plates is non-reflective.

* * * * *